US008306834B1

(12) United States Patent
Harniman et al.

(10) Patent No.: US 8,306,834 B1
(45) Date of Patent: *Nov. 6, 2012

(54) BOUNCE BACK METHOD, SYSTEM AND APPARATUS

(75) Inventors: Brian Harniman, Stamford, CT (US); Thomas M. Sparico, Stamford, CT (US); Hugh J. Crean, Rowayton, CT (US); Christopher R. Lenz, Ridgefield, CT (US); Rambabu Vallabhajoyusulu, Norwalk, CT (US)

(73) Assignee: priceline.com, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/308,626

(22) Filed: Dec. 1, 2011

Related U.S. Application Data

(60) Continuation of application No. 12/912,627, filed on Oct. 26, 2010, now Pat. No. 8,095,401, which is a division of application No. 09/716,114, filed on Nov. 14, 2000, now Pat. No. 7,848,940.

(60) Provisional application No. 60/165,446, filed on Nov. 15, 1999.

(51) Int. Cl.
*G06Q 99/00* (2006.01)
(52) U.S. Cl. ....... 705/5; 705/1.1; 705/14.13; 705/14.33; 705/26.3; 705/400
(58) Field of Classification Search .................. 705/1.1, 705/14.13, 14.33, 26.3, 400
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |
| 4,247,759 | A | 1/1981 | Yuris et al. |
| 4,449,186 | A | 5/1984 | Kelly et al. |
| 4,553,222 | A | 11/1985 | Kurland et al. |
| 4,677,552 | A | 6/1987 | Sibley, Jr. |
| 4,751,728 | A | 6/1988 | Treat |
| 4,789,928 | A | 12/1988 | Fujisaki |
| 4,799,156 | A | 1/1989 | Shavit et al. |
| 4,903,201 | A | 2/1990 | Wagner |
| 4,931,932 | A | 6/1990 | Dalnekoff et al. |
| 5,021,953 | A | 6/1991 | Webber et al. |

(Continued)

FOREIGN PATENT DOCUMENTS

EP 0085546 1/1983

(Continued)

OTHER PUBLICATIONS

Microsoft Office 2000 Professional Edition, 1999, 14 pages.*

(Continued)

*Primary Examiner* — John Hayes
*Assistant Examiner* — Freda A Nelson
(74) *Attorney, Agent, or Firm* — Walter G. Hanchuk; Chadbourne & Parke, LLP

(57) ABSTRACT

A customer whose conditional purchase offer (CPO) has been accepted may receive a bounce back offer from a vendor (supplier-partner) of other services or products. The bounce back process determines whether a supplier-partner can participate in a bounce back transaction. If a bounce back transaction is effectuated between the customer and supplier-partner, the partner notifies the principal of the transaction. In the case of automobile rentals, the bounce back process permits a traveler to recognize reduced automobile rental rates while enabling a rental agency to more effectively manage its excess capacity. The CPO management system employing bounce back capability can be utilized to acquire any underlying product and/or service and bounce back product and/or service.

20 Claims, 14 Drawing Sheets

U.S. PATENT DOCUMENTS

| | | | |
|---|---|---|---|
| 5,136,501 | A | 8/1992 | Silverman et al. |
| 5,168,446 | A | 12/1992 | Wiseman |
| 5,191,523 | A | 3/1993 | Whitesage |
| 5,191,613 | A | 3/1993 | Graziano et al. |
| 5,224,034 | A | 6/1993 | Katz et al. |
| 5,243,515 | A | 9/1993 | Lee |
| 5,253,165 | A | 10/1993 | Leiseca et al. |
| 5,262,941 | A | 11/1993 | Saladin et al. |
| 5,283,731 | A | 2/1994 | Lalonde et al. |
| 5,297,031 | A | 3/1994 | Gutterman et al. |
| 5,329,589 | A | 7/1994 | Fraser et al. |
| 5,331,546 | A | 7/1994 | Webber et al. |
| 5,361,199 | A | 11/1994 | Shoquist et al. |
| 5,404,291 | A | 4/1995 | Kerr et al. |
| 5,420,914 | A | 5/1995 | Blumhardt |
| 5,426,281 | A | 6/1995 | Abecassis |
| 5,444,630 | A | 8/1995 | Dlugos |
| 5,467,269 | A | 11/1995 | Flaten |
| 5,500,793 | A | 3/1996 | Deming, Jr. et al. |
| 5,517,555 | A | 5/1996 | Amadon et al. |
| 5,519,769 | A | 5/1996 | Weinberger et al. |
| 5,537,314 | A * | 7/1996 | Kanter ................... 705/14.13 |
| 5,553,131 | A | 9/1996 | Minervino, Jr. et al. |
| 5,557,517 | A | 9/1996 | Daughterty, III |
| 5,557,518 | A | 9/1996 | Rosen |
| 5,570,283 | A | 10/1996 | Shoolery et al. |
| 5,592,375 | A | 1/1997 | Salmon et al. |
| 5,606,602 | A | 2/1997 | Johnson et al. |
| 5,611,052 | A | 3/1997 | Dykstra et al. |
| 5,615,269 | A | 3/1997 | Micali |
| 5,664,115 | A | 9/1997 | Fraser |
| 5,689,652 | A | 11/1997 | Lupien et al. |
| 5,694,551 | A | 12/1997 | Doyle et al. |
| 5,696,965 | A | 12/1997 | Dedrick |
| 5,715,402 | A | 2/1998 | Popolo |
| 5,717,989 | A * | 2/1998 | Tozzoli et al. ................ 705/37 |
| 5,732,400 | A | 3/1998 | Mandler et al. |
| 5,745,882 | A | 4/1998 | Bixler et al. |
| 5,757,917 | A | 5/1998 | Rose et al. |
| 5,758,328 | A | 5/1998 | Giovannoli |
| 5,774,883 | A | 6/1998 | Andersen et al. |
| 5,794,207 | A | 8/1998 | Walker et al. |
| 5,794,219 | A | 8/1998 | Brown |
| 5,797,127 | A | 8/1998 | Walker et al. |
| 5,799,285 | A | 8/1998 | Klingman |
| 5,809,478 | A | 9/1998 | Greco et al. |
| 5,826,244 | A | 10/1998 | Huberman |
| 5,832,452 | A | 11/1998 | Schneider et al. |
| 5,832,459 | A | 11/1998 | Cameron et al. |
| 5,835,896 | A | 11/1998 | Fisher et al. |
| 5,845,265 | A | 12/1998 | Woolston |
| 5,878,403 | A | 3/1999 | DeFrancesco et al. |
| 5,897,620 | A | 4/1999 | Walker et al. |
| 6,085,169 | A | 7/2000 | Walker et al. |
| 6,134,534 | A | 10/2000 | Walker et al. |
| 6,199,076 | B1 | 3/2001 | Logan et al. |
| 6,332,128 | B1 | 12/2001 | Nicholson |
| 6,510,418 | B1 | 1/2003 | Case et al. |
| 6,553,347 | B1 * | 4/2003 | Shevchenko et al. ...... 705/14.25 |
| 6,578,011 | B1 * | 6/2003 | Forward .................... 705/14.39 |
| 6,754,833 | B1 | 6/2004 | Black et al. |
| 6,886,000 | B1 | 4/2005 | Aggarwal et al. |
| 6,970,835 | B1 | 11/2005 | Forward |
| 7,133,835 | B1 | 11/2006 | Fusz et al. |
| 7,263,505 | B1 | 8/2007 | Forlai |
| 2001/0018665 | A1 | 8/2001 | Sullivan et al. |
| 2009/0150256 | A1 | 6/2009 | Pylant |
| 2009/0271317 | A1 * | 10/2009 | Walker et al. ................ 705/51 |
| 2009/0292647 | A1 * | 11/2009 | Porat et al. .................. 705/80 |
| 2010/0004978 | A1 | 1/2010 | Pickard et al. |

FOREIGN PATENT DOCUMENTS

| | | |
|---|---|---|
| WO | 96/34356 | 10/1996 |
| WO | 97/46961 | 12/1997 |

OTHER PUBLICATIONS

"Setting the Pace—Marketers Are Taking Motorsports in New and Different Directions; Attendance at NASCAR is Growing", Nov. 1997, Promo, v X, n 12, p. 20+, (p pgs).*

"Gifts Certificates: The Flexible Incentive", Feb. 1994; Incentive; p. GC1 (19pgs).*

LANCORP Mortgage Services, http://www.lancorp-mortgage.com/retailpa.htm, 1998.

Inland Mortgage Corporation, http://inlandmortage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chronicle, vol. 20; No. 12; p. 37A, Aug. 22, 1997.

"What's Holding Up E-Cash?", C bernautics Digest, vol. 3; No. 7, Finance.

Resnick, Paul et al, "Roles for Electronic Brokers", http://ccs.mit.edu/CCSWP179.htm 1997.

Philatelists Online Information, http://www506.bonsai.com/q/@1313541hyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade-direct, http://www.trade-direct.com. 1997.

"Internet Mortgage Service Eliminates Loan Agents and Passes Commissions on to the Consumer", Yahoo! Finance, 1997.

Negroponte, Nicholas, "Pay Whom Per What When, Part 2", NEGROPONTE, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet-based system for remote Dutch auctions," Internet Research: Electronic Networking Applications and Policy, vol. 5, No. 4, pp. 10-16, 1995.

Franklin, Matthew K., et al., "The Design and Implementation of a Secure Auction Service," Proceedings: 1995 IEEE Symposium on Security and Privacy, pp. 2-14, 1995.

Tenenbaum, Jay M., et al.,"CommerceNet: Spontaneous Electronic Commerce on the Internet," 1995 IEEE Spring Conference, pp. 38-43.

Sirbu, Marvin and Tygar, J.D., "NetBill: An Internet Commerce System Optimized for Network Delivered Services," IEEE 1995 Spring Conference, pp. 20-25.

Bunker, Ted, "How Auction Technology Sped and Enhanced Sale of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1-18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services—Linking the Information Warehouse to the Information Consumer," IEEE 1994 Spring Conference, pp. 165-171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order for Business & Leisure Travel", Marketel International, Inc., 1991.

Inhaber, Herbert, "How to Solve the Problem of Siting Nuclear Waste," Transactions of the American Nuclear Society, vol. 62, Nov. 11-15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller; Ross M., "The Design of Decentralized Auction Mechanisms that Coordinate Continuous Trade in Synthetic Securities," Journal of Economic Dynamics and Control, pp. 237-253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way to Purchase Travel, Automated Service Would Let Companies Bid for Already-Filled Airline Seats", Business Travel News, Nov. 6, 1989.

"An Electronic Auction Ahead for Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems: Study of an Application," IEEE 1987 Spring Conference, pp. 161-162.

Littlefair, T., "Homelink: a unique service," Computer Bulletin, pp. 12-14, Jun. 1986.

Banatre, Jean-Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79-90, 1985.

Banatre, Michel, "Distributed auction bidding system," IPC Business Press, Computer Communications, vol. 4, No. 4, Aug. 1981.

Courter et al; Microsoft Office 200 Professional Edition; 1999; SYBEX; pp. 450-451, 462-463, 471, 480-481, 496, 404-505.

"Gifts Certificates: The Flexible Incentive", Feb. 1997; Incentive; p. GC1 (19pgs).

"Setting the Pace—Marketers Are Taking Motorsports in New and Different Directions; Attendance at NASCAR is Growing," Nov. 1997, Promo, v X, n 12, p. 20+ (p pgs).

Fishkin, Ken, Foresight Exchange Tutorial: (http://www.ideosphere.com/fx/docs/tutorial.html) Feb. 19, 1999 at p. 1-5.

"Bid.com 1998 Third-Quarter Revenue Increases 12.5 Percent From Second Quarter", Business Wire, Oct. 29, 1998.

Final Report: Virtual Hospital (http://www.telemed.medadmin.uiowa.edu./TRCDocs/Pubs/FinalReport/cVirtualH/virtualH/virtualh02.html), download date: Sep. 20, 1998.

"First Source Become a Member", More Reasons to Join First Source! (http://www.fsource.com/bene.html), download date: Sep. 20, 1998.

Jeffrey Davis, "Big Storm rising", Business 2.0, Sep. 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded form www.sdtech.com/mls/process on Aug. 7, 1997.

Trade-Direct: We Help You Trade With Confidence, selected pages downloaded from www.trade-direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117-124 (Apr. 1997).

Bryant, Adam, "Shaking Up Air Fares' Status Quo", The New York Times, Mar. 31, 1997.

Silverman, Robert, "GM Drives Web Ad Insertion Network", Inside Media, Feb. 26, 1997, vol. 9, No. 4, p. 1; ISSN:1046-5316.

"Flycast Introduces Unique 'Open Exchange' Match-Making Service", Interactive Marketing News, Feb. 21, 1997, vol. 4, No. 8.

"UK's" World Telecom Unveils New WorldSaver Tariffs, Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real-Time Travel Auction Service to Be Available Via World Wide Web: ETA to Open Bidding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft-Uniform Commercial Code Revised Article 2 (Sales), parts 2, 3, and 7, pp. 1-15, Jan. 4, 1996.

Speidel, Richard E. & Schott, Lee A., "Impact of Electronic Contracting on Contract Formation Under Revised UCC Article 2, Sales",C878 ALI-ABA 335, Dec. 9, 1993.

Hainer, Cathy and Grossman,Cathy Lynn, "Where Vacationing Kids Get Good Care", USA Today, Apr. 1, 1992, at p. 4D.

Del Rosso, Laura, "Ticket-Bidding Firm Closes Its Door," Travel Weekly, Mar. 12, 1992.
"Newsletters", The Atlanta Constitution, Mar. 1, 1992, p. K 13.
"Crtl's Blue Ribbon Deals for 1992", Consumer Reports Travel Letter, Jan. 1992, vol. 8, No. 1, at pp. 3-5.
Traveler's Notes; Bookit Report, Consumer Reports Travel Letter, Dec. 1991 at p. 143.
Feldman, Joan M., "To Rein in Those CRSs; Computer Reservation Systems", Air Transport World, Dec. 1991, at p. 89.
"MONEY BRIEFS; Buy Low, Fly High", Gannet News Service, Nov. 20, 1991.
"Buy Low, Fly High", USA Today, Nov. 14, 1991 at p. 15.
Traveler's Notes; Easier Airfare Bidding, Consumer Reports Travel Letter, Oct. 1991 at p. 119.
Nelson, Janet "Practical Traveler; Airlines Relaxing Policy on No-Refund Tickets", The New York Times, Sep. 22, 1991 at p. 3 of Section 5.
Pelline, Jeff, "New Service; Now You Can Make a Bid on Your Next Airline Ticket Home", The Orange County Register, Sep. 1, 1991 at p. E01.
"Bookit Airfare Bidding System (Fax for Your Plane Ticket?)", Consumer Reports Travel Letter, Sep. 1991, pp. 97 & 106.
Upton, Kim "French Say Monoliths Off-limits to Visitors", Los Angeles Times, Aug. 25, 1991.
Pelline, Jeff, "Travelers Bidding on Airline Tickets; SF Firm Offers Chance for Cut-Rate Fares". San Francisco Chronicle, Section A4, Aug. 19, 1991.
Carey, Christopher, "Firm Offers Auction for Airline Tickets", St. Louis Post-Dispatch, Aug. 7, 1991 at p. 1B.
Del Rosso, Laura, "Marketel Says It Plans to Launch Air Fare 'Auction' in June", Travel Weekly, Apr. 29, 1991.
NASDAQ Adds Enhancements to SOES Limit Order File, Securities Week, Nov. 26, 1990, p. 5.
Ritter, Jeffrey B., "Scope of the Uniform Commercial Code: Computer Contracting Cases and Electrical Commercial Practices", 45 Bus. Law 2533, Aug. 1990.
Greenberg, Peter, S., "Judging DeRegulation", The Record, Jul. 22, 1990 at p. T01.
Greenberg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.
Wallace, David, "Company Planning to Let Fliers Bid on Airfares", Philadelphia Business Journal, Mar. 26, 1990 at p. 15.
"Letters to Business Extra", The San Francisco Chronicle, Dec. 26, 1989 at p. C7.
Schrage, Michael, "An Experiment in Economic Theory; Labs Testing Real Markets", The Record Section Bl, Nov. 26, 1989.
Schrage, Michael Innovation/Micheal Schrage: Laboratory Experiments with Market Economics, Los Angeles Times, Nov. 23, 1989 at p. D1.
Golden, Fran "AAL's Riga Doubts Marketel's Appeal to Retailers", Travel Weekly, Nov. 13, 1989.
Del Rosso, Laura, Firm Proposes ticket-bidding system; Marketel explores electronic auction of travel; Marketel International., Travel Weekly, Section No. 91, vol. 48, p. 1; Nov. 13, 1989.
Carlsen, Clifford, "Polaris Group Set to Fly the Leveraged Sky", San Francisco Business Times, Nov. 6, 1989 at p. 1.
Kuttner, Robert, "Computers May Turn the World into One Big Commodities Pit", Business Week, Sep. 11, 1989.
Carlsen, Clifford, "From Airline Tickets to Human Organs, the Electronic Markets Are Booming", San Francisco Business Times, Aug. 14, 1989 at p. 17.
"Public May Submit Bids to Get Bargain Rates", Wall Street Journal, Section 2; p. 1, col. 1; Aug. 1, 1989.
American Airlines Internet Silent Auction, selected pages downloaded from www.americanair.com.
Apollo Host Computer, selected pages downloaded from www.appollo.com.
"Auctioning unsold airline tickets." (http://www.newciv.org/GIB/BOV/BV-409.HTMI), at p. 1.
Cathay Pacific:CyberTraveler Auction #3—Official Rules, selected pages downloaded from www.cathaypacific.com.
CSM Online: About Collector's Super Mall downloaded from www.csmonline.com.
Sabre Decision Technologies, selected pages downloaded from www.sabre.com.
PhoneMiser: Frequently Asked Questions, downloaded from www.phonemiser.com.
The United Computer Exchange: How It All Works, selected pages downloaded from www.uce.com.
Tired of Shopping for the Best Home Loan?, Mortgage Loan Specialists.

* cited by examiner

Fig. 5A

| Ticket Request Number 102944411 |

Dear JANE DOE,
Congratulations! We have ticket(s) for you. Your complete flight itinerary is listed below.

***********************************************************************
NEED A RENTAL CAR FOR YOUR TRIP? Congratulations on getting a great price on <<AIRLINE PARTNER>> for your trip! Our airline partner, <<AIRLINE PARTNER>> has some great deals on rental cars in that area. If you're interested, click here: http://www.priceline.com/rental_cars=ID
***********************************************************************

| Flight Itinerary: | Traveler: Jane Doe |

Departure

Departures Date: Wednesday 07/01/98
Airline: America West Airlines
Flight Number 2129
Equipment: 733 Jet
Departs: Los Angeles International
Los Angeles, CA, US
Departure Time: 09:36 AM 07/01/98
Arrives: MC Carran International
Las Vegas, NV, US
Arrival Time: 10:33 AM 07/01/98

Connection

Airline: America West Airlines
Flight Number 135
Equipment: 757 Jet
Departs: MC Carran International
Las Vegas, NV, US
Departure Time: 011:14 AM 07/01/98
Arrives: JFK International
New York, NY US
Arrival Time: 07:00PM 07/01/98

Return

Airline: America West Airlines
Flight Number 2027
Equipment: 320 Jet
Departs: JFK International
New York, NY, US
Departure Time: 07:06 AM 08/15/98
Arrives: Los Angeles International
Los Angeles, CA, US
Arrival Time: 12:00PM 08/15/98

Connection

Fig. 5B
Continued
from Fig. 5A

Payment Information
Price per ticket:       $1200
Number of Tickets:      2
Subtotal:               $2400
Total Airport Fees:     $Data not found
Standard taxes and other fees:  $Data not found
Shipping and handling:  $Data not found Total charged to your credit card: $Data not found

Important Airport Check-In Details
If you chose electronic tickets, we will send you a confirmation of your itinerary by regular mail. Your electronic ticket confirmation is helpful for reference, but you do not need this confirmation to travel. All you need for airport check-in is a valid photo ID.

If you chose standard paper tickets, you should receive them within 2-3 business days. Remember that a signature is required for delivery and you will need a valid photo ID for airport check-in.

Airlines require that passengers check-in at the boarding gate at least 1 hour (2 hours for international) before the scheduled flight departure time. Be sure to give yourself plenty of time to get to the airport: if you fail to arrive at your gate on time, the airline has the right to cancel your reservation and make you ineligible for denied boarding compensation. Tickets issued through priceline cannot be changed or used on a later date.

If you have any questions or need assistance, please call our Customer Service Department at 1-800-340-0575. You can also review itinerary at any time on our secure site at: http://www.priceline.com/checkstatus/.

Continued
on Fig. 5C

Fig. 5C
Continued
from Fig. 5B

Special Information for International Travelers
   Airline regulations require international passengers to reconfirm their continuing and return flight reservations with their airline. We recommend that passengers reconfirm their flight reservations at least 72 hours in advance of each departure.

Also, international travel will almost always require a passport and/or visa depending on the country you're traveling to. Because it is the traveler's responsibility to gather documentation before departure please check with the consulate of the country you are traveling to for your documentation requirements. You may also visit these sites for more information:
Http://www.travisa.com/priceline2.htm
Http://travel.state.gov/passport_services.html Thanks again for using priceline.com. Can you do us a favor? Please be sure to mention us to your friends and family. We appreciate the support!

Have a great trip!

Sincerely,

The priceline.com Customer Service Team

****************************************************************************
Save by naming your own price – only at priceline.com!
Check out all our name your own price services now at
http://www.priceline.com Airline Tickets – Hotel Rooms – New Cars – Home Mortgage
Home Equity Loans – Mortgage Refinancing NAME YOUR OWN PRICE!
Http://www.priceline.com
****************************************************************************

Fig. 6A

Congratulations! Your price was accepted!

| priceline.com | AIRLINE TICKETS |

Congratulations JANE DOE, your price was accepted!

Our partner, Delta Airlines, would like to extend a special deal for rental car rates in the San Francisco area. To rent a car in San Francisco, click here.

Your Ticket Request Number

205915015

Your flight itinerary is shown below. Please print out this page for your records.

| YOUR ITINERARY INFORMATION |
|---|
| Friday, September 10, 1999 |
| Delta Airlines, Flight-2304 |
| Depart: Boston, MA |
| General Edward Lawrence Logan Intl, |
| 2:48:00 PM |
| Arrive: Phoenix, AZ, |
| Phoenix Sky Harbor International, |
| 5:32:00 PM |

| Friday, September 10, 1999 |
|---|
| Delta Airlines, Flight-2624 |
| Depart: Phoenix, AZ, |
| Phoenix Sky Harbor International, |
| 6:32:00 PM |
| Arrive: Oakland CA, |
| Metropolitan Oakland International |
| 8:32:00 PM |

| Sunday September 12, 1999 |
|---|
| West Airlines, Flight-2622 |
| Depart: Oakland CA, |
| Metropolitan Oakland International |
| 11:44:00 AM |
| Arrive: Phoenix, AZ, |
| Phoenix Sky Harbor International, |
| 1:34:00 PM |

| Sunday September 12, 1999 |
|---|
| Delta Airlines, Flight-2824 |
| Depart: Phoenix, AZ, |
| Phoenix Sky Harbor International, |
| 2:39:00 PM |
| Arrive: Boston, MA |
| General Edward Lawrence Logan Intl, |
| 10:20:00 PM |

| Payment Information | E-TICKET |
|---|---|
| Passenger Names: John Doe, Jane Doe | |
| Price Per Ticket: $300.00 | |

Continued on Fig. 6B

Fig. 6B
Continued
from Fig. 6A

| Payment Information                          E-TICKET |
|---|
| Passenger Names: John Doe, Jane Doe<br>Price Per Ticket: $300.00 |

| Number of Tickets 2 |
|---|

| Purchase Information |
|---|
| Subtotal: $600.00<br>Airport Fees: $0.00<br>Standard Taxes & Other Fees: $50.00<br>Shipping & Handling: $0.00<br><br>Total charged to your card: $650.00 |

Additional Information
You chose electronic tickets. No paper tickets will be sent to you. Just show a valid photo ID when you check-in at the airport and you'll be allowed to board the plane. We'll send you a confirmation of your itinerary by first-class mail. This printed confirmation is a good reference, but you don't need it to travel.

Please note that the airlines require that passengers check-in at the boarding gate at least 30 minutes before the scheduled flight departure time. You will need a valid photo ID for airport check-in. Be sure to give yourself plenty of time to get to the airport: if you fail to arrive at your gate on time, the airline has the right to cancel your reservation and make you ineligible for denied boarding compensation. Tickets issued through priceline cannot be changed or used on a later date.

Please note: priceline.com is not responsible for any changes to this itinerary made by your airline. Please confirm your flights with your airline in advance of your departure.

| Thank you for using priceline.com! | | | | |
|---|---|---|---|---|
| Questions? Send us an e-mail. | | | | |
| Name Your Price | Info Center | Customer Service | Our Company | Home |

BOUNCE BACK METHOD, SYSTEM AND APPARATUS

CROSS-REFERENCE TO RELATED APPLICATION

This application is a Continuation of and claims priority under 35 U.S.C. §120 to prior U.S. Non-Provisional patent application Ser. No. 12/912,627 filed Oct. 26, 2010 entitled, "BOUNCE BACK METHOD, SYSTEM AND APPARATUS," which in turn is a Divisional of and claims priority under 35 U.S.C. §120 to prior U.S. Non-Provisional patent application Ser. No. 09/716,114, filed Nov. 14, 2000 entitled, "METHOD, SYSTEM AND APPARATUS TO FACILITATE CONDITIONAL PURCHASE ORDERS WITH BOUNCE BACK FUNCTIONALITY," which in turn claims priority from provisional U.S. Patent Application Ser. No. 60/165,446 entitled, "CONDITIONAL PURCHASE OFFER MANAGEMENT SYSTEM" filed Nov. 15, 1999 The entirety of the aforementioned applications are herein expressly incorporated by reference.

FIELD

This invention relates generally to a method, system and apparatus for arranging for the acquisition of goods and services, such as automobile rentals and, more particularly, to a bounce back method, system and apparatus for managing the acquisition of such goods and services in an arrangement where customers have already contracted for the purchase of other items, such as airline tickets or hotel reservations.

BACKGROUND

There is a large source of latent demand for goods and services associated with leisure and business travelers who purchase plane tickets and/or make hotel reservations. For example, when a reservation at a hotel is made, often the customer is from out of town and requires a mode of transportation that is not dependent on the traveler's own vehicle. Even more frequently, a person who books an airline reservation is travelling out of town and similarly requires a means of transportation independent of the traveler's personal vehicle. Automobile rental agencies recognize that many of these travelers have various options in selecting a mode of transportation, such as public transportation, hotel or airport shuttles, automobile rentals, and the like. Automobile rental agencies further recognize that although renting a vehicle often provides greater transportation flexibility to a traveler, cost considerations may result in the selection of another mode of transportation. If a traveler is aware of a competitive (or discounted) automobile rental offering, however, the traveler may be more apt to select such mode of transportation upon arriving at the destination in which the hotel and/or airport is located.

There is currently no effective way, however, for any retail agency or service, such as an automobile rental agency with excess capacity to be connected to a person who has made a hotel and/or airline reservation. In particular, there is no effective way for a retail agency or service with excess capacity in a specific location to communicate a competitive or discounted rate to a traveler that has entered into a binding contract to fly to or spend at least an evening in a hotel in a destination that is in the agency's excess capacity location.

It is apparent from the above deficiencies with conventional systems for selling goods and services, such as those related to travelers (e.g., airline passengers and hotel guests), that a need exists for a method, system and apparatus to connect travelers to retail agencies or services, such as automobile rental agencies, having excess capacity in an arrival destination, to facilitate the acquisition of such goods or services.

SUMMARY

A bounce back method, system and apparatus is used in a conditional purchase offer (CPO) management system for receiving conditional purchase offers from one or more customers, such as airline passengers, and evaluating the received CPOs against a number of CPO rules defined by a plurality of sellers, such as airlines, to determine whether any seller is willing to accept a given CPO. While the specific embodiments of the invention discussed herein relate to travel services, the bounce back method, system and apparatus has potential applications in other related areas of commerce.

A customer whose CPO has been accepted may receive a bounce back offer from a vendor (supplier-partner) of a second product or service—e.g., an automobile rental company. The bounce back process determines whether a supplier-partner is located in the customer's destination area. If a supplier-partner is located in the customer's destination area and has excess capacity, a bounce back offer may be made to the customer in accordance with a supplier allocation process. If the bounce back offer is accepted, a partner fulfillment process is effectuated. The bounce back process can be utilized to acquire any product or service offered in connection with an accepted CPO for an underlying product or service. In the case of vehicle rentals, the bounce back process permits a traveler to recognize reduced automobile rental rates while enabling a rental agency to more effectively manage excess capacity.

In one embodiment, a customer accesses a CPO management system web site and submits a CPO for a first product or service, such as an airline ticket or hotel reservation. The customer receives a communication, such as in the form of an e-mail, that the CPO has been accepted and a bounce back offer for a second product or service, such as an automobile rental, has been extended. The customer is then directed to a bounce back transaction for the acquisition of an automobile rental.

The customer can access the bounce back offer in a variety of ways. In one embodiment, a CPO server generates an e-mail to the customer advising the customer of the CPO acceptance and bounce back offer. The e-mail contains a hyperlink to a bounce back web page containing further information regarding the bounce back offer. The bounce back web page is generated by the CPO server specific to the supplier-partner allocated to participate in the bounce back offer. The bounce back web page may, in turn, contain a hyperlink to a cobranded web site. The customer's identification generated in the prior CPO transaction and information about the customer's itinerary can be transmitted securely via a hyperlink to the cobranded site. For convenience, the bounce back method, system and apparatus will be discussed in detail in connection with a cobranded site but can be conducted on a single site.

In another embodiment, the bounce back offer is received via a jump page containing a hyperlink to the cobranded web site. The customer can also defer the bounce back offer until a subsequent time or choose not to access the bounce back offer in which case the offer is terminated. Any form of communication can be used to implement the bounce back offer and transaction including on-line access, telephone, facsimile, e-mail, voice-mail, in person or through a travel agent. For example, a customer can telephone a CPO management system operator to check the status of a CPO and receive an interactive voice mail advising of the bounce back offer and directions to a bounce back web page.

In the cobranded web site, a customer can choose to accept or reject a bounce back product or service or optionally submit a counteroffer for the product or service to a supplier-partner allocated to participate in the bounce back offer. To the extent a bounce back offer is accepted a supplier-partner through the fulfillment process notifies a principal, such as a CPO operator, of the completed transaction. In one embodiment, the supplier-partner receives an identifier for the accepted CPO and notifies a principal of the accepted bounce back transaction using the identifier so that the principal can monitor bounce back transaction commitments.

In the supplier allocation process, the CPO management system identifies at least one supplier-partner that can participate in a bounce back transaction for a product or service. For example, in the case of automobile rentals, the CPO management system identifies at least one automobile rental company that has excess capacity in a flight or hotel destination which is the subject of a CPO. If more than one supplier-partner can participate in a bounce back transaction, the CPO management system determines an order that each supplier-partner can participate in the transaction, e.g., receive a bounce back look.

The partner-supplier order can be determined based on market share data or data tracking tables. In one embodiment, the order is determined using the following formula for the first 3-6 months that the bounce back process is in use: Base City Share+(Premium*Unused Share). In another embodiment, the order is determined using the following formula after the first 3-6 months: Base City Share+(Premium*Unused Share)+Performance Factor. Where two or more supplier-partners receive the same score, a random number generator can be used to allocate a bounce back look. The random number generator could be weighted to reflect the relative market share of each supplier-partner. In the event no supplier-partner can participate in a bounce back transaction, the CPO management system sends a customer a standard success acceptance of a CPO.

BRIEF DESCRIPTION OF THE DRAWINGS

FIGS. 5A-C comprise an exemplary e-mail template including an automobile rental opportunity notification, click-through link to a cobranded site and flight itinerary;

FIGS. 6A-B comprise an exemplary jump page including an automobile rental opportunity notification, click-through link to a cobranded site and flight itinerary;

It will be understood that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate embodiments of this invention and, together with the detailed description, serve to explain the principles of this invention.

DETAILED DESCRIPTION

A. CPO Management System

Figure 1:
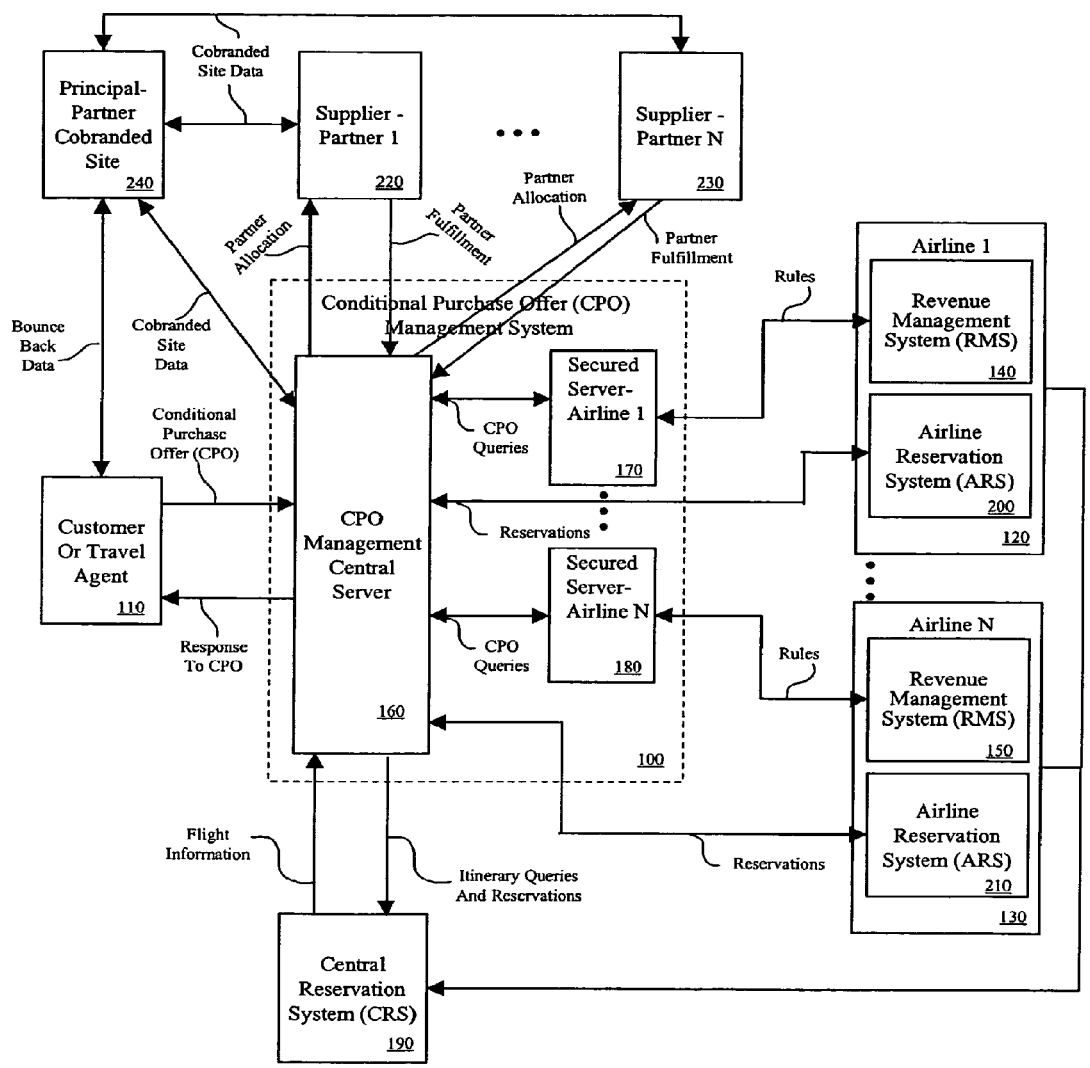
FIG. 1 is an exemplary schematic block diagram illustrating an embodiment of the CPO management system including bounce back capability.

FIG. 1 shows a CPO management system 100 for receiving conditional purchase offers from one or more customers 110 and for evaluating the received CPOs against a number of CPO rules defined by one or more sellers, such as airlines 120, 130, to determine whether any seller is willing to accept a given CPO. As discussed further below, if a seller accepts a given CPO, and ultimately delivers goods complying with the customer's CPO, the CPO management system 100 binds the customer 110 on behalf of the accepting seller, to form a legally binding contract.

As used herein, a CPO is a binding offer containing one or more conditions submitted by a customer 110 for the purchase of an item, such as air travel, at a customer-defined price. In the illustrative airline embodiment, the customer-defined conditions would include itinerary parameters, such as the origin and destination cities; acceptable dates and times of departure and return; and whether connecting flights or stopovers are acceptable to the customer. In addition, the parameters of a CPO may allow a customer to specify one or more preferred airline(s), flights, seat assignments, seat class, aircraft type, refund/change rules, or maximum layover time.

A CPO rule is a set of restrictions defined by a given seller, such as an airline, to define a combination of such restrictions for which the seller is willing to accept a predefined minimum price. The CPO rules are utilized by the CPO management system to render a decision to either accept, reject or counter a CPO on behalf of a particular seller. In one embodiment, the CPO rules are generated by the revenue management system (RMS) 140, 150 of the respective airline. In alternate embodiments, the CPO rules may be generated by a yield management system, a profit management system, or any system which controls and manages inventory.

The RMS 140, 150 employs a CPO rules generation process to generate CPO rules by evaluating current inventory, pricing and revenue information, as well as historical patterns and external events, to forecast future travel. Thereafter, the CPO rules are utilized by the CPO management system 100 to render a decision to either accept, reject or counter a CPO on behalf of a particular airline. The CPO rules are dynamic in nature and may be updated by a given airline, as necessary.

As shown in FIG. 1, the CPO management system 100 comprises a CPO management central server 160 and one or more secured airline servers 170, 180. Each secured airline server may be associated with one or more airlines and each server stores, among other things, the CPO rules defined by any associated airlines, such as airline 120. Each secured airline server 170, 180 may be remotely located from the CPO management central server 160, as shown in FIG. 1, or may be integrated with the CPO management central server 160.

Each customer 110 contacts the CPO management system 100, for example, by means of telephone, facsimile, online access, e-mail, voice mail, in-person contact or through a travel agent, and provides the CPO management system 100 with the terms of their CPO. It is noted that each customer 110 may employ a general-purpose computer for communicating with the CPO management system 100. The general-purpose computer of each customer 110 is comprised of a processing unit, a modem, memory means and any software required to communicate with the CPO management system 100.

In one embodiment, CPO management central server 160 is configured as a web server, and conventional communications software such as the Netscape Navigator web browser may be used to transmit a CPO. In one embodiment, the CPO management central server 160 has a web page on the world wide web, allowing the buyer to provide information through the interface of the conventional web browser software. In one embodiment, the buyer selects the subject of the goods he wishes to purchase by selecting from a list of possible subjects. Subjects might include airline tickets, hotel rooms, rental cars, insurance, mortgages, clothing, etc. After the subject is selected, a form is displayed on a video monitor of a buyer interface. This form is an electronic contract with a number of blanks to be filled out by the buyer, with each blank representing a condition of a CPO.

Once the terms of the CPO have been received by the CPO management system 100, the CPO management central server 160 will execute a CPO management process to compare the received CPO against the CPO rules of each airline. A result of this comparison, the CPO is either accepted, rejected or countered. Thereafter, the customer 110 is notified of the response of the airlines to the CPO. If an airline accepts the CPO, or if the customer 110 accepts a counteroffer from an airline, a ticket is then booked by the CPO management system 100 with the appropriate restrictions which meet the conditions defined by the customer 110.

In one embodiment, the CPO management system 100 may optionally access a central reservation system (CRS) 190, such as a SABRE or WORLDSPAN, to perform itinerary queries that will identify particular flights which satisfy a given itinerary, and to make reservations. In addition, the CPO management system 100 could alternatively access the proprietary airline reservation systems (ARSs) 200, 210 of each airline to perform such itinerary queries and to make reservations with the respective airline. The ARSs 200, 210 maintained by each airline 120, 130 are each essentially a subset of the central CRS 190. Thus, in view of the overlapping functions and capabilities of the CRS 190 and the proprietary reservation systems 200, 210 of each airline, the CPO management system 100 could access any of such systems to obtain required information, and the terms "CRS" and "ARS" are used interchangeably herein.

As shown in FIG. 1, each airline 120, 130, also has an RMS 140, 150. The RMSs 140, 150 generate CPO rules and otherwise allocate and price airline tickets for sale to CPO customers. Generally, the RMSs 140, 150 are utilized to optimize revenue per flight. An RMS performs seat inventory control by periodically adjusting nested booking limits ("buckets") for the various fare classes, in order to optimize the passenger mix and thereby maximize the generated revenue.

The CPO management system 100, customer 110, airlines 120, 130 and CRS 190 (collectively, the "nodes") transmit digitally encoded data and other information between one another. The communication links between the nodes comprise a cable, fiber or wireless link on which electronic signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave, or satellite networks.

Although the CPO management system 100 is illustrated herein as a system for selling airline tickets, the CPO management system 100 could be utilized to sell any underlying good or service, such as automobiles, insurance, computer equipment or hotel accommodations. For a more detailed discussion of a general CPO management system for selling such items, as well as an associated revenue management system (RMS) and central reservation system (CRS), see U.S. patent application Ser. No. 08/889,319, entitled "Conditional Purchase Offer Management System," which was filed as a continuation in part application of U.S. patent application Ser. No. 08/707,660, filed on Sep. 4, 1996, incorporated by reference herein.

CPO Management System Including Bounce Back Capability

As shown in FIG. 1, the CPO management system 100 includes bounce back capability. In addition to communicating with a customer 110, CRS 190 and ARSs 200, 210 of airlines 120, 130, the CPO management system is in communication with one or more supplier-partners 220, 230 and principal-partner cobranded site 240. This system enables a bounce back opportunity (such as automobile rental bounce back) to be presented to a customer 110 as described more fully below with reference to FIGS. 2, 3a, 3b and 4-10.

The available supplier-partners 220, 230 are, in one embodiment, automobile rental agencies that are located in a customer's travel destination area and have agreed to participate in the bounce back program. The principal-partner cobranded site 240 provides an interface to which a bounce back customer is directed, such as a bounce back page. The bounce back page is the graphical user interface that indicates the availability of a bounce back automobile rental opportunity. The page also prompts a bounce back candidate for information to effectuate the bounce back rental. The cobranded site 240 combines information of the supplier-partner 220, 230 that is allocated for a specific bounce back opportunity and the principal (the operator of the CPO management system, or the party selling the underlying product or service, such as an airline or hotel, or an agent that effectuated the CPO acceptance on behalf of the airline or hotel). It should be understood that the cobranded site 240 may be designed so that the automobile rental offer is a customer benefit provided as a result of the customer using the services of the underlying airline or hotel. Accordingly, in such an embodiment, the airline or hotel is listed as the principal of the bounce back benefit provided by the allocated rental agency. Alternatively, the page may be designed to inform the customer 110 that the principal of the bounce back opportunity that is supplied by the supplier-partner 220, 230 is the CPO management system operator or an agent that effectuated the CPO acceptance of the underlying product or service, such as an airline ticket or hotel reservation.

The supplier-partners 220, 230 and CPO central server 160 are in communication with one another to effectuate the partner allocation process and the partner fulfillment process. The partner allocation process identifies which supplier-partners 220, 230 offer service from the airport or hotel location identified in the customer CPO, and determines the order of the supplier-partners (if more than one) that may view or make the offer. The partner fulfillment process is where the supplier-partner 220, 230 informs the principal-partner of a successful bounce back rental and the associated data (including referral and commission information) is transferred to the principal and executed. Both of these processes are described more fully below with reference to FIGS. 7 and 9, respectively.

Although the bounce back system is illustrated herein as handling automobile rentals as the bounce back service or product, the bounce back system could be utilized to sell any good or service, such as airplane tickets, hotel accommodations, insurance or computer equipment.

Figure 2:
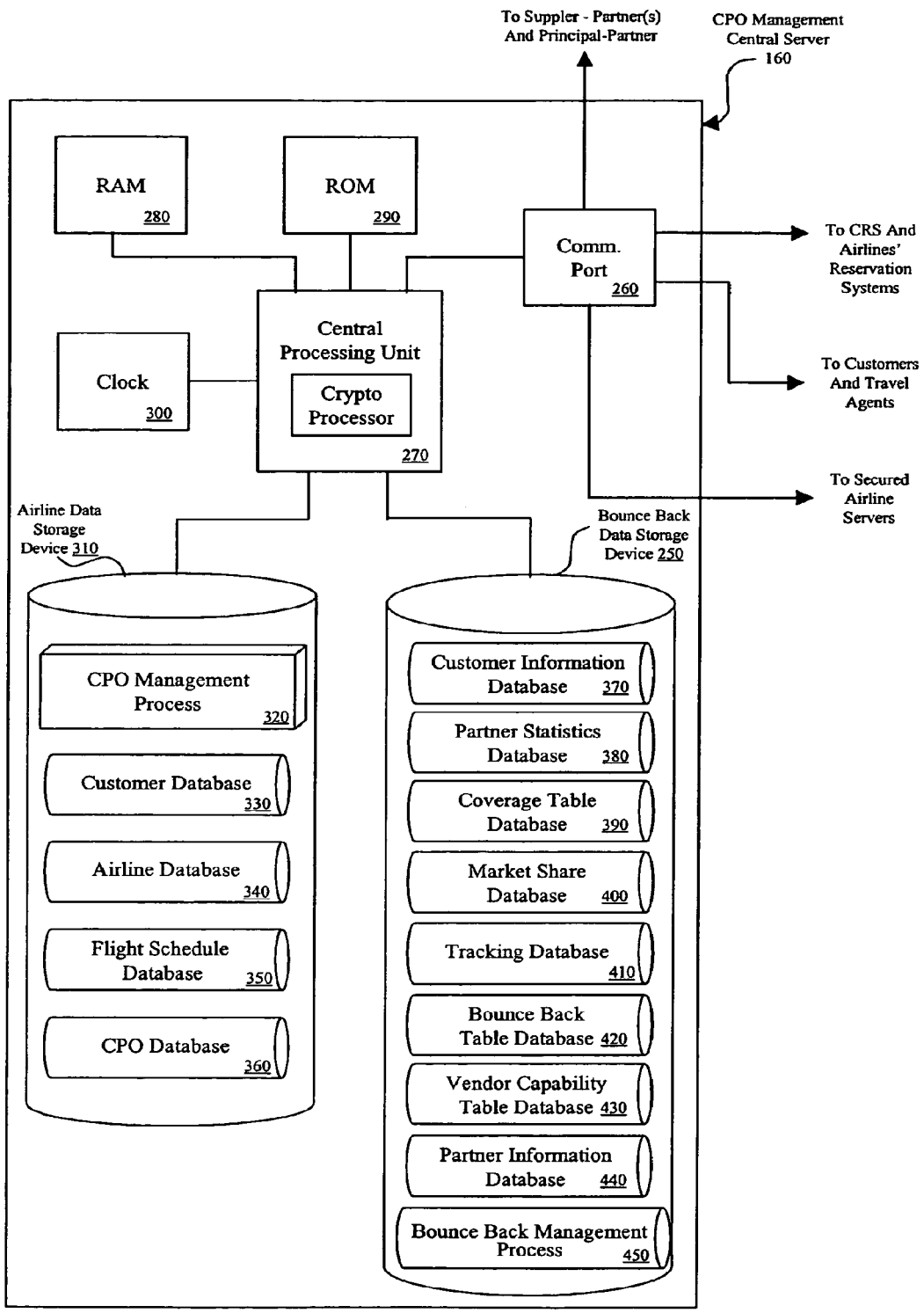
FIG. 2 is an exemplary schematic block diagram illustrating an embodiment of the CPO management central server including an additional data storage device and communication port to support bounce back capability.

C. CPO Management Central Server Including Data Storage Device and Communication Port to Support Bounce Back Capability FIG. 2 is an exemplary illustration of the architecture of a CPO management central server 160, including a bounce back data storage device 250 and communication port 260 to support bounce back capability. The CPO management central server 160 comprises certain standard hardware components, such as a central processing unit (CPU) 270, a random access memory (RAM) 280, a read only memory (ROM) 290, and a clock 300, as well as an airline data storage device 310, and communications port 260. The CPU 270 is linked to each of the other listed elements, either by means of a shared data bus, or dedicated connections, as shown in FIG. 2.

The ROM 290 and/or airline data storage device 310 are operable to store one or more instructions which the CPU 270 is operable to retrieve, interpret and execute. For example, the ROM 290 and/or airline data storage device 310 may store processes to accomplish the transfer of required payments, charges and debits, between the airlines 120, 130 and customers 110. In particular, the CPO management process 320 may transmit the credit card information associated with a given customer 110 to the credit card issuer for payment, if a ticket is actually issued to the customer 110.

The CPU 270 comprises a control unit, an arithmetic logic unit (ALU), and a CPU local memory storage device, such as, for example, a stackable cache or a plurality of registers. The control unit is operable to retrieve instructions from the airline data storage device 310 or ROM 290. The ALU is operable to perform a plurality of operations needed to carry out instructions. The CPU local memory storage device is operable to provide high-speed storage used for storing temporary results and control information.

The airline data storage device 310 further includes a customer database 330, an airline database 340, a flight schedule database 350, and a CPO database 360. The customer database 330 may store information on each customer of the CPO management system 100, including biographical information and billing information, such as a credit card number. The airline database 340 may store information on each airline which is registered with the CPO management system 100 to sell airline tickets to CPO customers, including address and contact information. The flight schedule database 350 may store specific flight information for each O & D Pair. Finally, the CPO database 360 may contain a record of each CPO being processed by the CPO management system 100, including the terms of the CPO and the associated status.

In addition, the airline data storage device 310 includes a CPO management process which receives each CPO from a customer 110, compares the CPO against the CPO rules of each airline 120, 130, and determines whether to accept, reject or counter the CPO on behalf of an airline.

The communications port 260 connects the CPO management central server 160 to the central reservation system (CRS) 190 and the proprietary reservation systems (ARSs) 200, 210 maintained by each airline 120, 130. The communications port 260 connects the CPO management central server 160 to individual customers and travel agents, such as the customer 110, for example, by means of an Internet connection using the public switched telephone network (PSTN). The communications port 260 connects the CPO management central server 160 to any remote secured airline servers. The communications port 260 may include multiple communication channels for simultaneously establishing a plurality of connections. The CPO management central server 160 could alternatively be implemented with multiple communication ports or with a single connection to an ethernet network, which in turn provides the central server 160 with a connection to the various nodes.

As shown in FIG. 2, CPO management central server 160 includes additional storage and communication capability which support bounce back capability. As discussed further below in conjunction with FIGS. 3*a*, 3*b* and 4-10, bounce back data storage device 250 includes a customer information database 370, partner statistics database 380, coverage table database 390, market share database 400, tracking database 410, bounce back table database 420, vendor capability table database 430 and partner information database 440. Moreover, bounce back data storage device 250 includes a bounce back management process 450 for ensuring that the appropriate databases are accessed as required.

Communications port 260 connects the CPO management central server 160 to the CRS 190, ARSs 200, 210 maintained by each airline 120, 130, as well as to supplier-partners 220, 230 and principal partner 240. It should be noted that although FIG. 1 shows communications with each supplier partner 220, 230 in another embodiment one entity may handle the bounce back process communications for all of the potential bounce back supplier-partners. The communications port may contain multiple communications channels for simultaneously establishing a plurality of connections. Moreover, communications may be effectuated in various ways, including by means of an internet connection using the public switched telephone network (PSTN).

D. Operation of the Bounce Back Method, System and Apparatus

Once a CPO is accepted by or on behalf of an airline (or for any type of service or product), the availability to sell a second service or product exists. The supplier or seller of the second service or product may be connected in some manner to purchasers of the underlying service or product. For example, customers who make reservations for a flight or for a hotel room often have transportation needs when reaching their destination. Automobile rental agencies, particularly those agencies whose fleet capacity exceeds demand, may benefit by stimulating such travelers to rent their vehicles through a "bounce back" process. A bounce back process is the method of connecting customers 110, whose CPO for airline or hotel services has been accepted, to vendors of other services or products, such as supplier-partners 220, 230. Although the present embodiment describes giving travelers whose CPO has been accepted the opportunity to rent a car from a group of automobile rental companies 220, 230, it should be understood that the products or services need not be associated to the travel industry. Accordingly, the bounce back program may be applied to any products and/or services.

Figure 3A:
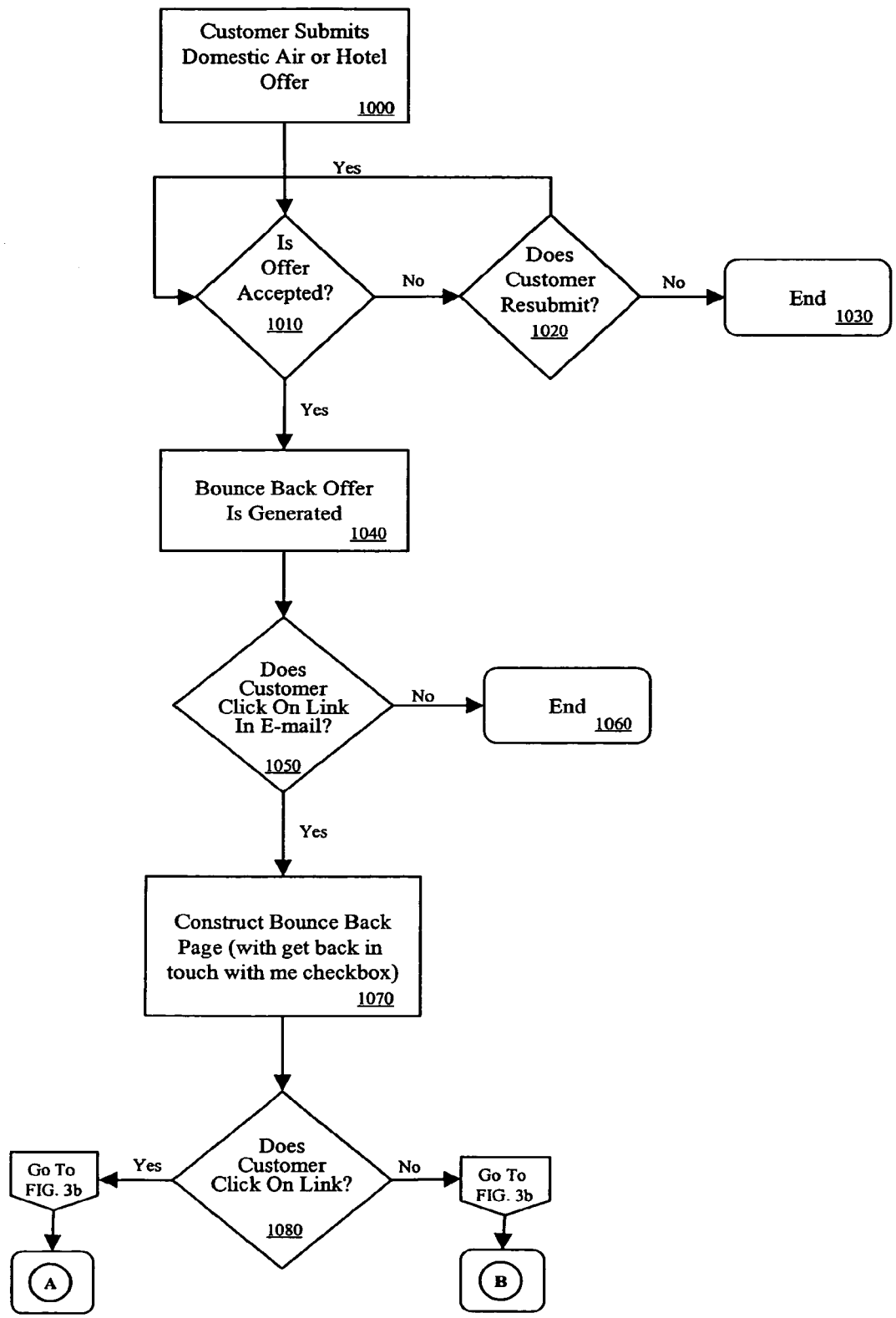
FIGS. 3a and 3b, collectively, are flowcharts describing an exemplary bounce back management process.
Figure 3B:
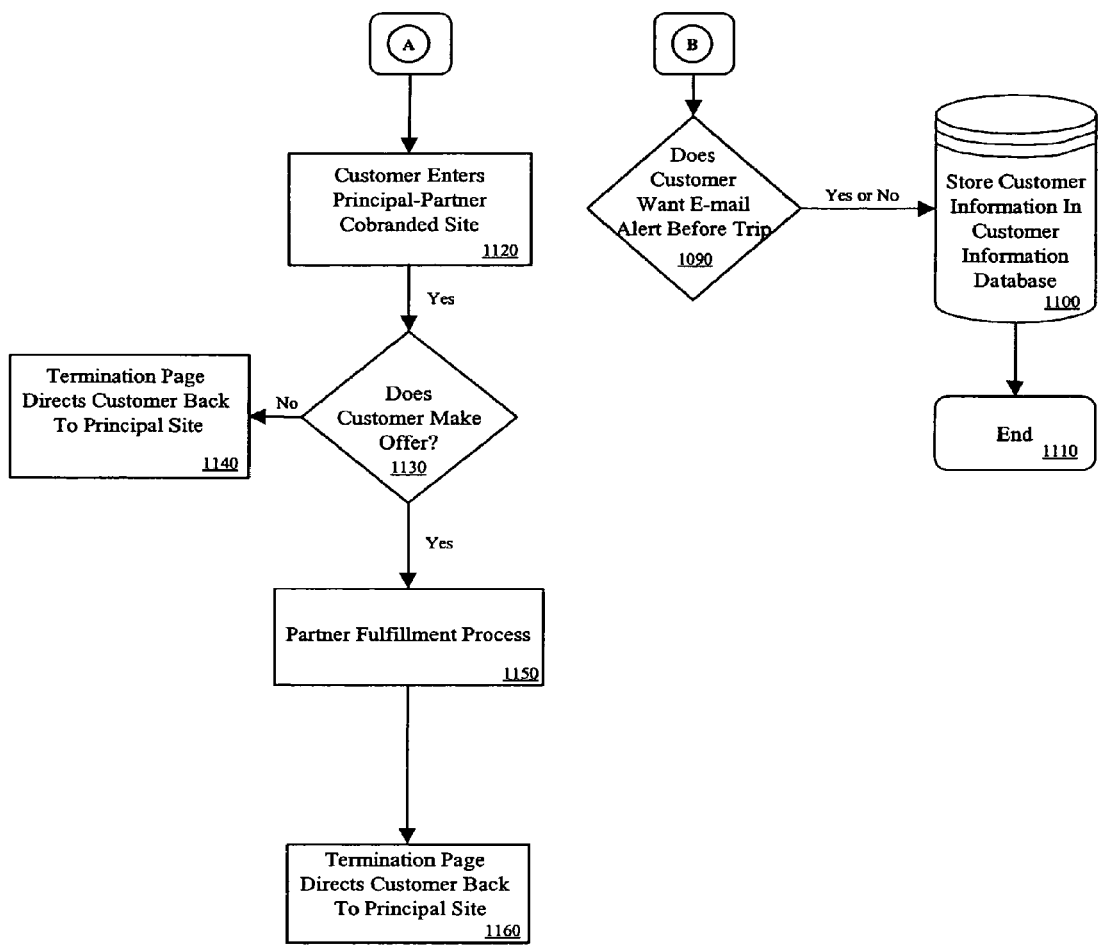

The operation of a bounce back program will now be described with reference to FIGS. 3*a*, 3*b* and 4-10 and further references to FIGS. 1 and 2. Turning to FIGS. 3*a* and 3*b*, as an initial step, a customer 110 (e.g., traveler) accesses the CPO management system 100 and places an offer (step 1000). As described above, the CPO may be accepted or rejected. Such a determination is made in step 1010. If the CPO is not accepted and the customer does not resubmit an offer or CPO (step 1020), the CPO management process transmits the rejection of the CPO to the customer 110 and the process is terminated (step 1030). If, however, the customer resubmits a CPO or a counteroffer is made, step 1010, which determines whether such CPO is accepted, is repeated. If a CPO is accepted, a bounce back offer is generated (step 1040) (as described more fully below with reference to FIG. 4).

A bounce back offer is an offer presented to all successful air or hotel customers 110 whereby the customer 110 is given the opportunity to, in this case, rent a vehicle from a supplier partner(s) such as an automobile rental company 220, 230. In the present embodiment, it is required that a CPO is accepted by or on behalf of an airline and/or hotel (e.g., that the customer 110 is bound) and, as described below, that the destination airport or hotel city is covered by one of the supplier-partners 220, 230 (the supplier-partner is an automobile rental company, located in a customer's travel destination area, that has agreed to participate in the bounce back program). Once these two requirements (a CPO is accepted and a destination has coverage by supplier-partner 220, 230) are met, the customer 110 is designated a bounce back candidate.

Figure 4:
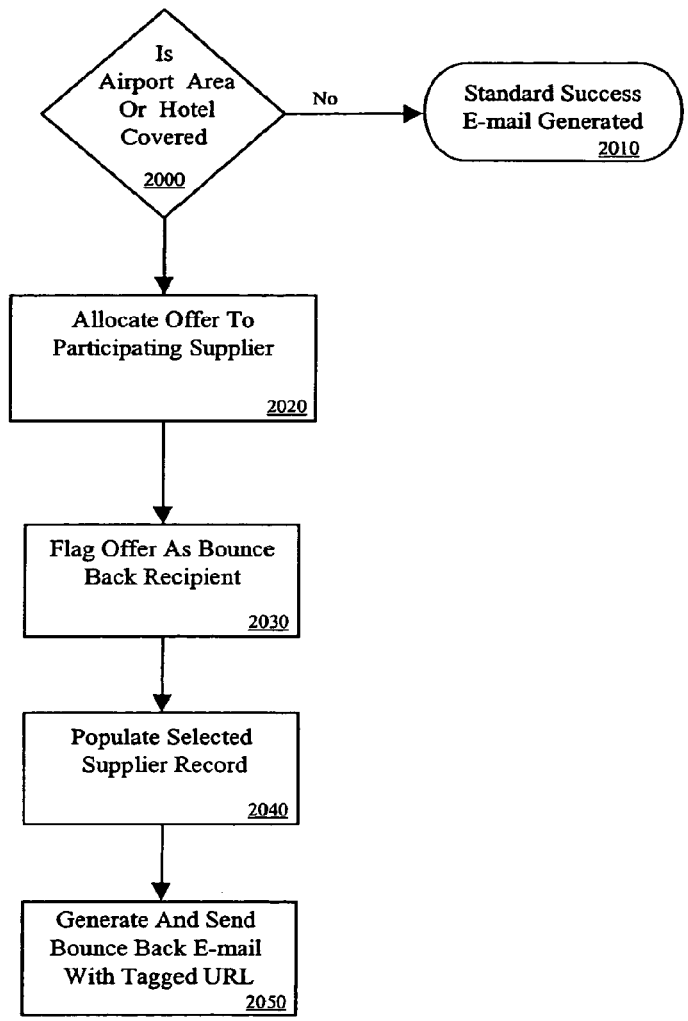
FIG. 4 is a flowchart describing an exemplary bounce back offer generation process of the bounce back management process of FIGS. 3a and 3b.

FIG. 4 is a flowchart identifying the steps required to generate a bounce back offer. In step 2000, a determination is made as to whether the destination (airport or hotel) area is serviced by one of the supplier-partners 220, 230. Such a determination may be made by referring to Coverage Table Database 390 which links available supplier-partner to airport and hotel codes. Accordingly, each supplier-partner will be linked to at least one airport and/or hotel code to effectuate such coverage determination. If there is no available supplier-partners for a given destination, the standard success e-mail is generated in step 2010. The standard success e-mail informs a customer 110 that the underlying airline or hotel CPO was accepted but is silent with respect to a related automobile rental opportunity.

If the hotel or airport destination area is serviced by a supplier-partner, the offer is allocated to a participating supplier (step 2000) (supplier allocation is described more fully below with reference to FIG. 7). In step 2030, the customer is flagged as a bounce back recipient, and, in step 2040 the supplier record is populated. By flagging the customer 110 as a bounce back, the customer 110 receives a preferred automobile rental opportunity usually in the form of a reduced rate. In alternative embodiments, the bounce back candidate may be offered other benefits such as a free vehicle upgrade, additional rental days at no extra charge, etc. Such benefits may vary among suppliers and may depend on the supplier's current excess fleet capacity. An e-mail with a Uniform Resource Locator (URL) linked to the automobile rental supplier-partner 220, 230 or supplier-partner cobranded web-site 240 is generated and sent to the customer 110 (step 2050). Cobranded site 240 is the interface between the principal/supplier and the customer 110 which executes a dialog to effectuate a bounce back rental.

The confirmation e-mail sent to the customer 110 is modified to include notification that an automobile rental opportunity is pending. In addition to the automobile rental opportunity notification, the e-mail may include the traditional confirmation data including the flight itinerary and/or hotel information. The e-mail may also include a message that the automobile rental offer is a promotional deal sponsored by the airline and/or hotel that has accepted the offer. An exemplary e-mail template including an automobile rental opportunity notification, click-through link to a cobranded site and flight itinerary is shown in FIGS. 5A-C.

In one embodiment, customers may also receive the bounce back offer via the check status page off of the principal's homepage. For customers who choose this path, the initial details of the offer that were contained in the e-mail will be presented in a jump page hosted by the principal. The jump page contains the hyperlink to the cobranded site 240. An exemplary jump page including an automobile rental opportunity notification, click-through link to a cobranded site and flight itinerary is shown in FIGS. 6A-B.

In another embodiment, the URL available for the automobile rental opportunity may be re-accessed at various points subsequent to the acceptance of a CPO but prior to a customer's travel. The URL may be bookmarked and, in one embodiment, may only be accessible for a limited time (e.g., predetermined number of hours or days). The bounce back page may have an option or a get back in touch with me checkbox that allows a customer who chooses to defer an offer of an automobile rental opportunity until a subsequent time (e.g., three to seven days prior to the customer's travel date).

With reference to FIG. 3a, a determination is made as to whether the customer 110 clicked on the e-mail linked to the automobile rental opportunity or principal partner cobranded site 240 (step 1050). If the customer does not click on the e-mail link, the bounce back process is terminated in step 1060. If, however, the link is accessed, a bounce back page is constructed (step 1070) indicating that the customer is potentially interested in an automobile rental opportunity (construction of the bounce back page is described more fully below with reference to FIG. 8). It should be noted that although communication between the customer 110, the cobranded site 240 and the CPO management central server 160 in the present embodiment is effectuated using e-mail, other forms of communication, including telephone, facsimile, online access, chat, in person contact and the like, may be used.

Once the bounce back page is constructed, a determination as to whether the customer 110 has accessed the page is made in step 1080. If the customer 110 chooses not to access such page, the customer 110 is asked in step 1090 whether an e-mail alert is desired before the customer's trip. The customer's response is stored in Customer Information Database 370 (step 1100) and an alert is provided to the customer at a later date, if requested. The alert serves to remind the customer 110 of the availability of an automobile rental opportunity and instructs the user to access the corresponding cobranded page by clicking on the URL enclosed in the alert. If no alert is requested, the bounce back process is terminated in step 1110.

If, in step 1080, the customer clicks on the link or a subsequent e-mail alert is selected, the customer enters principal/partner cobranded site 240 (step 1120). In the present embodiment, the principal is the company that effectuated the CPO acceptance of underlying product or service (e.g., airline or hotel) and/or operator of the CPO management central server 160 of the CPO management system 100. The partner is the automobile rental agent 220. It should be understood that the cobranded site 240 may be designed so that the automobile rental offer appears as a benefit provided as a result of the customer using the services of the underlying airline or hotel. Alternatively, the page may be designed to inform the customer 110 that the automobile rental opportunity that is supplied by the automobile rental agency 220 is sponsored by the principal (e.g., CPO management system operator). The supplier-partner's 220 product/service availability is updated from the information that was stored in Partner Statistics Database 380.

In step 1130, the customer 110 may make an offer for a vehicle rental. In an alternative embodiment, the customer may view an automobile rental offer and either accept, reject or make a counter-offer to the automobile rental agency. If the customer 110 does not make and/or accept a rental offer, the customer 110 is redirected back to the principal's site in step 1140. If, however, the customer makes and/or accepts an offer for a vehicle rental, the partner fulfillment process (described more fully below with reference to FIG. 9), which is the process whereby the supplier-partner informs the principal of a successful bounce back rental and the associated data (including referral and commission information) is transferred to the principal, is executed in step 1150. Upon completion of the partner fulfillment process, the customer 110 is redirected to the principal's site in step 1160.

Figure 7:
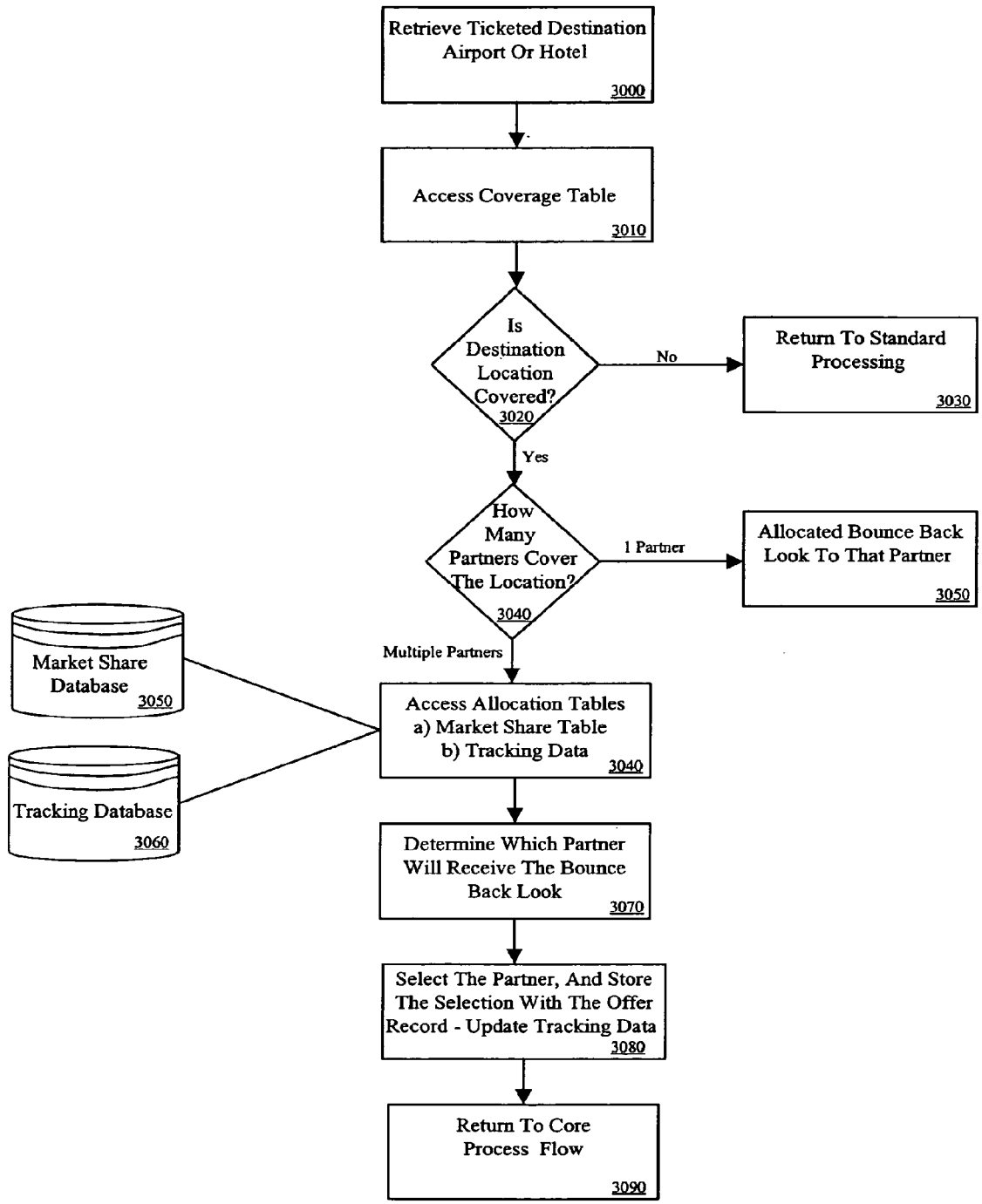
FIG. 7 is a flowchart describing an exemplary supplier-partner allocation process of the bounce back management process of FIGS. 3a and 3b.
Figure 8:
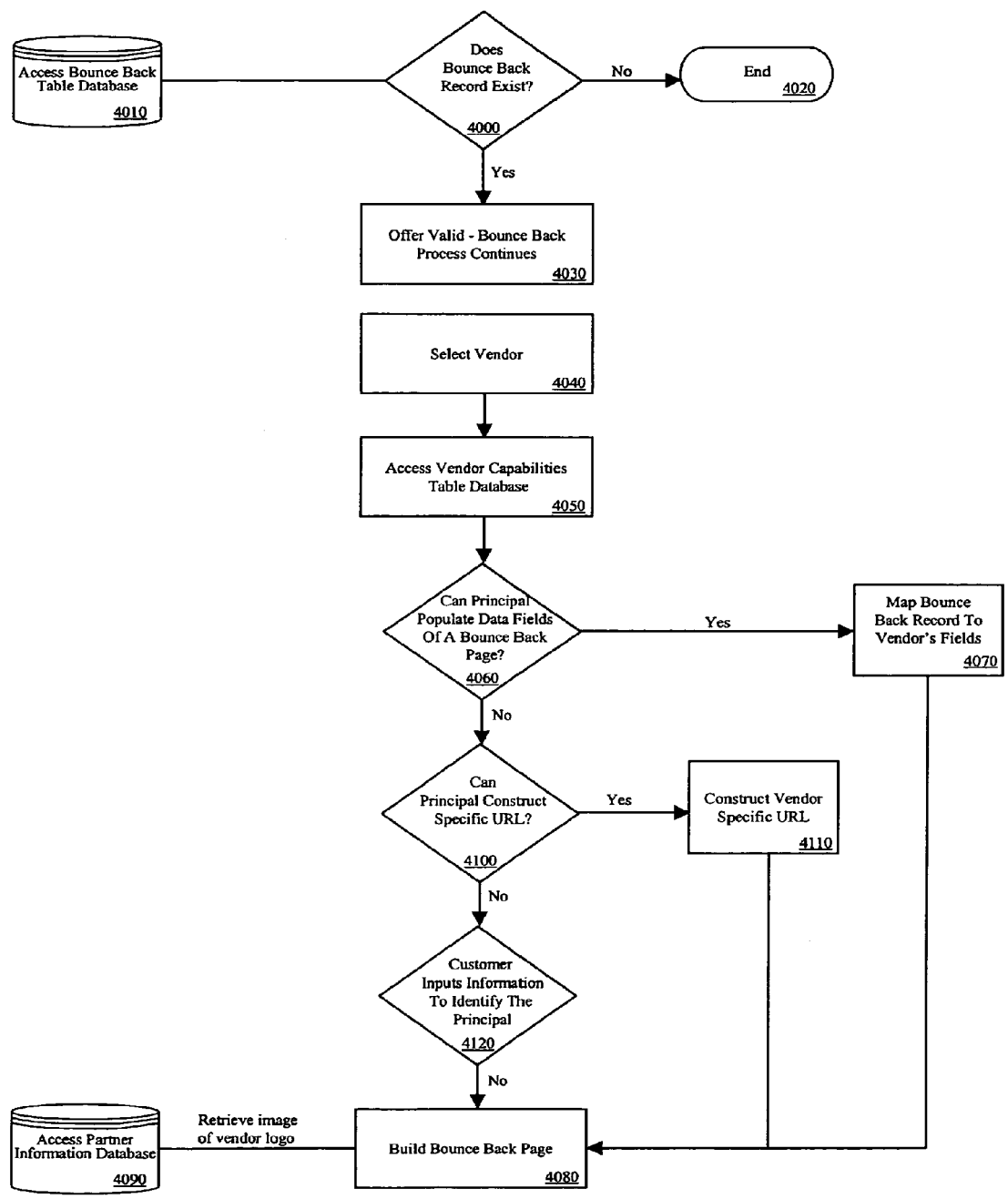
FIG. 8 is a flowchart describing an exemplary bounce back page construction process of the bounce back management process of FIGS. 3a and 3b.

Referring to the flowchart in FIG. 7, the supplier allocation process is described. The allocation process comprises—(1) identifying which supplier-partners 220, 230 offer service from the airport or hotel location in the customer offer; and (2) determining the order of the suppliers (if more than one) that may view or make the offer. It should be understood that any of the allocation techniques of provisional U.S. Patent Application No. 60/179,008 entitled SYSTEM AND METHOD FOR ALLOCATING A CONDITIONAL PURCHASE OFFER FOR A HOTEL RESERVATION TO ONE OF A PLURALITY OF HOTEL ENTITIES IN A BUYER DRIVEN ELECTRONIC COMMERCE SYSTEM filed Jan. 28, 2000 and of U.S. patent application Ser. No. 09/252,574 entitled SYSTEM AND METHOD FOR ALLOCATING BUSINESS TO ONE OF A PLURALITY OF SELLERS IN A BUYER DRIVEN ELECTRONIC COMMERCE SYSTEM filed Feb. 18, 1999 are incorporated herein by reference.

In step 3000, the airport or hotel destination is determined. A Coverage Table Database 390 which stores all available partner suppliers 220, 230 based on a customer's destination is accessed (step 3010). A determination as to whether the destination location is covered is made in step 3020. If no such coverage exists for the customer's destination area, the process returns the customer to standard processing and the bounce back process-is-terminated (step 3030). If, however, coverage does exist, a determination as to the number of supplier-partners is made in step 3040. If only one partner exists in the customer's destination area, then the bounce back look is allocated to that partner in step 3050.

When multiple supplier-partners are available to handle a customer bounce back, an analysis is undertaken to determine which partner will receive the bounce back look or opportunity. Any criteria or formula can be selected for this analysis, including but not limited to performance related criteria and/or market share criteria. In one embodiment, market share tables and data tracking tables (step 3040) are accessed from the Market Share Database 400 (step 3050) and Tracking Database 410 (step 3060), respectively. This data allows the principal to determine which supplier-partner will receive the bounce back look or opportunity. In another embodiment, one of two formulas may be used in selecting among multiple supplier-partners. One formula that can be used for the first 3-6 months that the bounce back process is in use is: Base City Share+(Partner Premium*(Unused Share), where the unused share may comprise the non-supplier-partner share of the relevant market. For example, in the case of two supplier-partners, if one supplier-partner has a 5% share of the market and the second supplier-partner has a 25%, the unused share comprises 70% of the market. Another formula that may be used after the process has some history (e.g., after the first 3-6 months) is: Base City Share+(Partner Premium*Unused Share)+Partner Performance Factor. The Base City Share variable is the supplier-partner's relative market share for the customer's destination city. The data may be updated monthly, annually or at some other frequency. The Partner Premium is a factor which provides a bias to partner(s) based on a negotiated/contracted commitment with the principal (e.g., in return for a monetary investment). Partner Performance compares the relative bind rate (success in offering rental opportunity and/or gaining customer commitment of such rental opportunity) across supplier-partners and provides preference to the partners who are aggressively participating in the bounce back program. Such preference is provided by multiplying the Unused Share variable with a more competitive (higher) Partner Premium variable. The Partner Performance factor, which may be incorporated into the evaluation once the program has been effect for some amount of time, is a variable that may be included in the formula taking into consideration a favorable experience of the automobile rental bounce back program with respect to each supplier-partner.

With the above formulas and stored data, the partner who will receive the bounce back look is determined in step 3070. The automobile rental agency with the highest score is the allocated supplier-partner. If more than one supplier-partner receives the same score, one may be selected at random. The random number generator can be configured to reflect each supplier-partner's relative market share. It should be noted that in another embodiment, the supplier-partner may be selected by a random number generator in all cases obviating the logic associated with formulas described above. The supplier-partner is selected in step 3080 as well as storing the selection in a database and updating the tracking data in Tracking Database 410. Upon selecting the partner and updating the associated databases, the process returns to the bounce back offer generation process (step 3090) described with reference to FIG. 4.

Once the offer is allocated to a supplier-partner and the bounce back offer is generated, a bounce back page is created as shown in step 1070 of FIG. 3*a*. Bounce back page construction is described in more detail with reference to FIG. 8. The bounce back page is a cobranded (principal and partner) site 240. The bounce back page may contain certain dynamic data elements that are populated on an offer specific basis. Such data elements include, but are not limited to, itinerary information including flight and/or hotel information, click through link to supplier-partner cobranded web-site and vendor/supplier logo and/or special text to be accessed to make a cobranded page. A checkbox item may also be provided that allows a customer to be reminded of an outstanding automobile rental opportunity before the travel date. In one embodiment, the reminder must be the same offer that is sent by e-mail to the customer 110.

In step 4000, the CPO management central server 160 determines whether a bounce back record exists, e.g., an airplane ticket request number or hotel request number. Any successful or bound offer is assigned a bounce back record number. A bounce back record number is located by accessing (step 4010) the data stored in the Bounce Back Table Database 420. If a bounce back number does not exist, the process is terminated in step 4020. If, however, a bounce back number exists, the offer is valid and bounce back processing continues (step 4030).

Selecting a vendor (supplier-partner) (step 4040), involves determining the vendor's technical capabilities by accessing (step 4050) data in the Vendor Capability Table Database 430. In one embodiment, the minimal requirements for a vendor to participate is the ability to serve the principal's customer in the destination location or to provide negotiated rates to the principal's customers.

In step 4060, a determination is made as to whether the principal is capable of populating the requisite vendor data fields of a bounce back page. If the principal is capable of populating the page, the bounce back record is mapped to the vendor's fields (step 4070) and the bounce back page is built in step 4080. When building the bounce back page, the Partner Information Database 440 may be accessed (step 4090) to retrieve data such as the vendor's logo.

If the principal is unable to populate the data fields, a determination is made in step 4100 as to whether the principal can construct a specific URL for access to the vendor. If a vendor specific URL can be devised, such URL is constructed in step 4110 and the bounce back page is built in step 4080. In this embodiment, the vendor supplies information for the data fields. In another embodiment where the principal cannot construct a vendor specific URL, some other means to identify the principal may be selected to construct the bounce back page, such as where the customer inputs information to identify the principal, including the bounce back record (step 4120). Once the bounce back page is constructed, a vehicle has been created for a customer 110 to access the cobranded site 240 and make an offer for automobile rental services.

Termination pages are accessed at different points (usually points of failure) of the bounce back process. In order for the principal and supplier-partners 220 to learn what a customer 110 did not like about the offer and to generate a demand collection system (a statistical analysis to improve successful rental opportunities), termination points may be monitored and the associated data collected. The termination pages will give a customer the opportunity to do the following: (1) identify the price that the customer would be willing to pay for the rental car offered; (2) provides feedback about what features of an automobile rental product that the customer would like to see; (3) provide feedback about what the customer did and did not like about the offer; (4) have an "e-mail me later" checkbox functionality; and link to the principal's homepage. It should be further noted that where a bounce back offer is successfully accepted, an opportunity to gather customer feedback may still be available. Moreover, the aforementioned feedback features are only a few examples of types of data that may be collected. Accordingly, additional information may be sought and analyzed.

Figure 9:
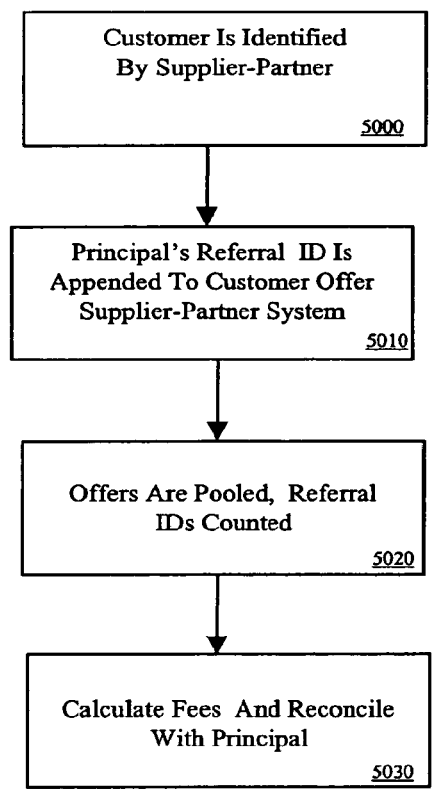
FIG. 9 is a flowchart describing an exemplary partner fulfillment process of the bounce back management process of FIGS. 3a and 3b.

Turning to FIG. 9, the partner fulfillment process is described. Once a vehicle rental commitment between the customer 110 and the supplier-partner 220 has been established, the supplier-partner 220 informs the principal of the transaction. In step 5000, the customer 110 is identified by the supplier-partner 220. This may be accomplished by transmitting a unique identification code for each customer in the URL. In step 5010, the principal's referral identification code is appended to the customer offer in the vehicle rental system. The commitments are pooled and the referral identification codes are counted in step 5020. Then, in step 5030, the fees are calculated and reconciled with the principal. The fees may be calculated as a flat fee or as a percentage of the total sale. The fees may vary among supplier-partners. The frequency of such reconciliation may also vary among the supplier-partners 220, 230 (e.g., daily, weekly, etc.). Upon completion of the supplier-partner fulfillment process, the bounce back process is complete.

Figure 10:
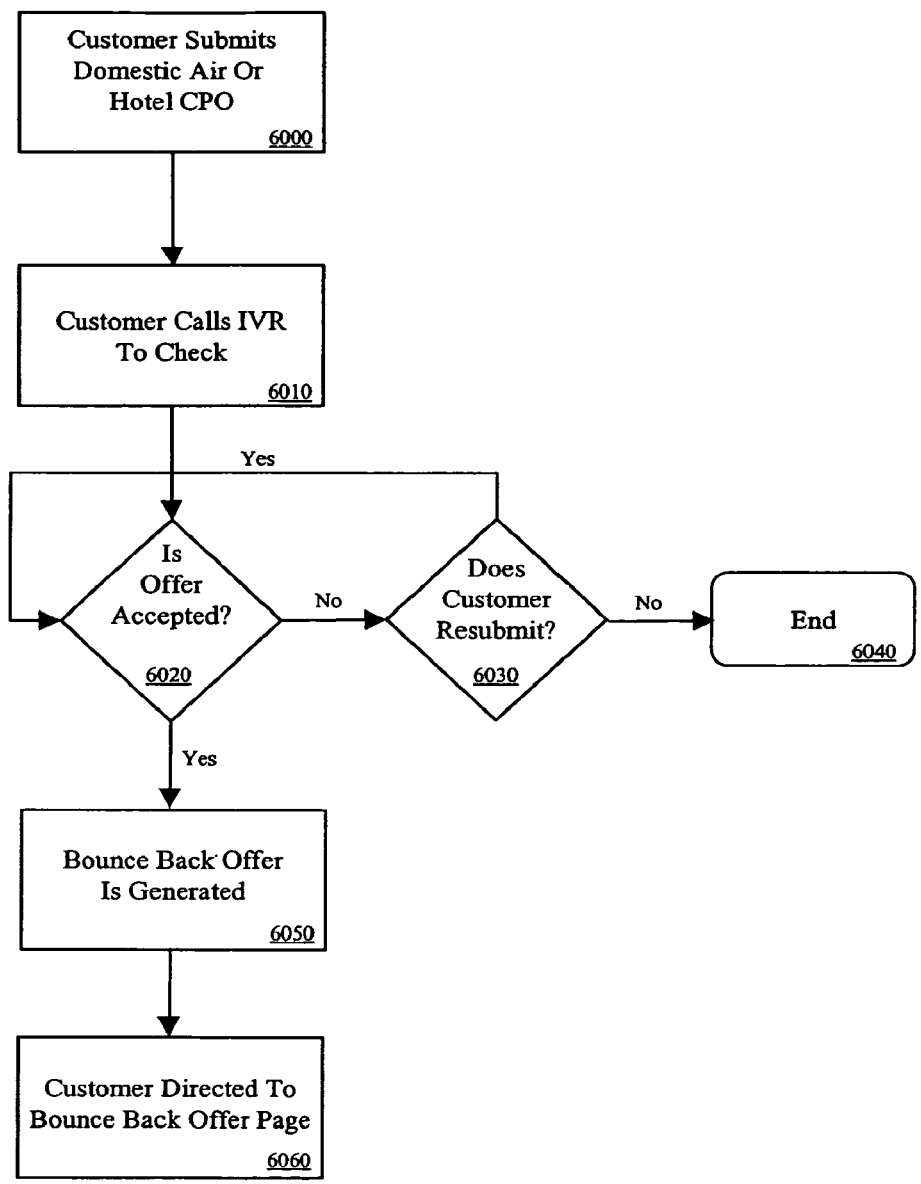
FIG. 10 is a flowchart describing an interactive voice response process that may be utilized in conjunction with the bounce back management process of FIGS. 3a and 3b.

Turning to FIG. 10, the interactive voice response (IVR) bounce back feature is described. As described above, the bounce back process may be effectuated by any suitable communications means, including e-mail, voice mail, online, facsimile, telephone, in-person contact or through a travel agent. There will be times that a customer 110 may interact with the principal on the telephone, for example to check the status of the customer's CPO. The IVR bounce back feature allows the principal to inform a customer 110 of a bounce back opportunity and to direct the customer 110 to a bounce back offer page in order to effectuate access to the system. In step 6000, the customer 110 submits an air or hotel CPO. Subsequently, in step 6010, a customer calls the IVR system (instead of, for example, using internet or world wide web access) to check the status of the CPO. In step 6020, a determination is made as to whether the CPO is accepted. If the CPO is not accepted and no additional CPO is generated (step 6030), the IVR bounce back process is terminated (step 6040). If, however, the original CPO, or a subsequent CPO, is accepted, a bounce back offer is generated in step 6050 (bounce back offer generation is described above in detail with reference to FIG. 4). The customer is also directed, in step 6060, to the bounce back offer page which may be accessed, in one embodiment, by a customer interface device in communication with the CPO management system 100 described above. In one embodiment, the IVR system directs the customer 110 to the bounce back page by accessing an IVR script that is automatically generated when a CPO is confirmed by telephone and a bounce back opportunity associated with that customer 110 exists. Once the customer 110 is directed to the bounce back page that has been generated, the customer 110 may continue with the bounce back progress if so desired as directed beginning at step 1040 of FIG. 3a (and described above in detail with reference to FIG. 4).

The IVR bounce back system may also provide assistance to a bounce back rental customer. If a customer requires assistance with his or her vehicle rental and information is entered identifying the customer as a bounce back customer, the IVR system has the capability of transferring the customer to the rental agency. In another embodiment, the IVR system provides a customer who needs additional vehicle rental assistance with the correct name and number(s) to access the automobile rental agency. Alternatively, if the customer reaches a principal customer service representative, the customer service agent will know which supplier-partner is associated with the bounce back customer and will have the necessary information to direct the customer to the appropriate vendor. Accordingly, a Vendor Information Table Database may be devised which may include, but is not limited to, the following information: (1) name and business address of the vendor; (2) telephone number of the vendor (ideally toll-free number); and (3) website address of the vendor.

Although illustrative embodiments have been described herein in detail, it should be noted and understood that numerous variations may be made within the scope of this invention without departing from the principle of this invention and without sacrificing its chief advantages. The terms and expressions have been used as terms of description and not terms of limitation. There is no limitation to use the terms or expressions to exclude any equivalents of features shown and described or portions thereof and this invention should be defined with the claims which follow.

For example, the CPO management system can render a decision to accept an offer for a hotel reservation and generate a bounce back offer for airline tickets. Moreover, as previously indicated, although the CPO management system 100 employing bounce back capability has been illustrated in an airline/automobile rental environment, the CPO management system 100 employing bounce back capability could be utilized to acquire any underlying product and/or service and bounce back product and/or service.

The invention claimed is:

1. A method using a computer for facilitating an on-line bounce back transaction, comprising:
   receiving, by said computer, a conditional purchase offer to acquire a first product or service from a customer, said conditional purchase offer including a customer-specified price;
   after receiving said conditional purchase offer, determining whether said conditional purchase offer is to be accepted;
   if said conditional purchase offer is accepted, determining whether a bounce back opportunity can be offered to said customer;
   identifying at least one supplier-partner that can participate in said on-line bounce back transaction;
   determining, by said computer, an order that each supplier-partner can participate in said on-line bounce back transaction where there is more than one supplier partner, wherein said order is determined using a formula for an initial period as follows:

Base City Share+(Premium*Unused Share);

transmitting an acceptance of said conditional purchase offer to said customer and a bounce back offer to acquire a second product or service;
   receiving an inquiry from said customer regarding said second product or service; and
   generating a bounce back web page with a hyperlink to access a cobranded web site to effectuate a bounce back transaction between said customer and a said at least one supplier-partner.

2. A method using a computer to facilitate a transaction for a second product or service, comprising:
   receiving, by said computer, a conditional purchase offer to acquire a first product or service from a customer, said conditional purchase offer including a customer-specified price;
   after receiving said conditional purchase offer, determining whether said conditional purchase offer is to be accepted;
   determining whether said customer can be offered an opportunity to acquire said second product or service;
   identifying at least one supplier-partner that can participate in said transaction;
   determining, by said computer, an order that each supplier-partner can participate in said transaction where there is more than one supplier partner, wherein said order is determined using a formula for an initial period as follows:

Base City Share+(Premium*Unused Share);

transmitting an acceptance of said conditional purchase offer to said customer and an offer to acquire a second product or service;
   receiving an inquiry from said customer regarding said second product or service; and
   transmitting information to said customer to effectuate said transaction.

3. The method of claim 2, wherein said second product or service is an automobile rental, hotel reservation or airline ticket.

4. The method of claim 2, wherein said first product or service is an airline ticket or hotel reservation.

5. The method of claim 2, wherein said offer for said second product or service is transmitted via e-mail containing a hyperlink to a cobranded web site or a bounce back web page.

6. The method of claim 2, wherein said offer for said second product or service is transmitted via a jump page containing a hyperlink to a cobranded web site or a bounce back web page.

7. The method of claim 5, wherein said inquiry is received by accessing said hyperlink.

8. The method of claim 5, further comprising transmitting said offer for said second product or service with a checkbox to defer the offer until a subsequent time.

9. The method of claim 8, further comprising transmitting an e-mail alert containing said hyperlink to access said cobranded web site or said bounce back web page at said subsequent time.

10. The method of claim 5, further comprising terminating said offer for said second product or service when said customer does not to access said hyperlink.

11. The method of claim 2, wherein said information includes an electronic contract form for said second product or service.

12. The method of claim 2, further comprising allocating a bounce back look to said supplier-partner.

13. The method of claim 12, wherein said transaction is effectuated with said supplier-partner allocated said bounce back look.

14. The method of claim 2, wherein said order is determined using a formula after said initial period as follows:

Base City Share+(Premium*Unused Share)+Performance Factor.

15. The method of claim 2, wherein a random number generator is used to determine said order if two or more supplier-partners receive an equal score based on said formula.

16. The method of claim 2, further comprising generating a standard success acceptance if no supplier-partners can participate in said transaction.

17. A method using a computer to facilitate a bounce back transaction, comprising:
   receiving, by said computer, an inquiry from a customer regarding a bounce back product or service, after said customer receives an acceptance of a conditional purchase offer to acquire an underlying product or service;
   determining whether said customer can be offered an opportunity to acquire said second product or service;
   identifying at least one supplier-partner that can participate in said transaction;
   determining, by said computer, an order that each supplier-partner can participate in said transaction where there is more than one supplier partner, wherein said order is determined using a formula for an initial period as follows:

Base City Share+(Premium*Unused Share);

communicating an offer to said customer to acquire said bounce back product or service; and
   receiving an acceptance, rejection or counteroffer from said customer for said bounce back product or service.

18. A method using a computer to facilitate a bounce back transaction, comprising:
   receiving, by said computer, an offer from a customer to acquire a bounce back product or service, after said customer receives an acceptance of a conditional purchase offer to acquire an underlying product or service;
   determining whether said customer can be offered an opportunity to acquire said second product or service;
   identifying at least one supplier-partner that can participate in said transaction;

determining, by said computer, an order that each supplier-partner can participate in said transaction where there is more than one supplier partner, wherein said order is determined using a formula for an initial period as follows:

Base City Share+(Premium"Unused Share); and communicating an acceptance, rejection or counteroffer to said customer for said bounce back product or service.

19. A computer device for facilitating a transaction for a second product or service, comprising:
   a storage device and a processor connected to the storage device,
   the storage device storing at least one group membership identification and a program for controlling the processor,
   the processor operative with the program to,
   (i) receive a conditional purchase offer to acquire a first product or service from a customer, said conditional purchase offer including a customer-specified price;
   (ii) after receiving said conditional purchase offer, determine whether said conditional purchase offer is to be accepted;
   (iii) determining whether said customer can be offered an opportunity to acquire said second product or service;
   (iv) identifying at least one supplier-partner that can participate in said transaction;
   (v) determining an order that each supplier-partner can participate in said transaction where there is more than one supplier partner, wherein said order is determined using a formula for an initial period as follows:

Base City Share+(Premium*Unused Share);

(vi) transmit an acceptance of said conditional purchase offer to said customer and an offer to acquire a second product or service;
   (vii) receive an inquiry from said customer regarding said second product or service; and
   (x) transmit information to said customer to effectuate said transaction.

20. A non-transitory computer readable medium for facilitating a transaction for a second product or service, comprising:
   code for receiving a conditional purchase offer to acquire a first product or service from a customer, said conditional purchase offer including a customer-specified price;
   code for, after receiving said conditional purchase offer, determining whether said conditional purchase offer is to be accepted;
   code for, determining whether said customer can be offered an opportunity to acquire said second product or service;
   code for, identifying at least one supplier-partner that can participate in said transaction;
   code for, determining an order that each supplier-partner can participate in said transaction where there is more than one supplier partner, wherein said order is determined using a formula for an initial period as follows:

Base City Share+(Premium*Unused Share);

code for transmitting an acceptance of said conditional purchase offer to said customer and an offer to acquire a second product or service;
   code for receiving an inquiry from said customer regarding said second product or service; and
   code for transmitting information to said customer to effectuate said transaction.

* * * * *